Figure 1:
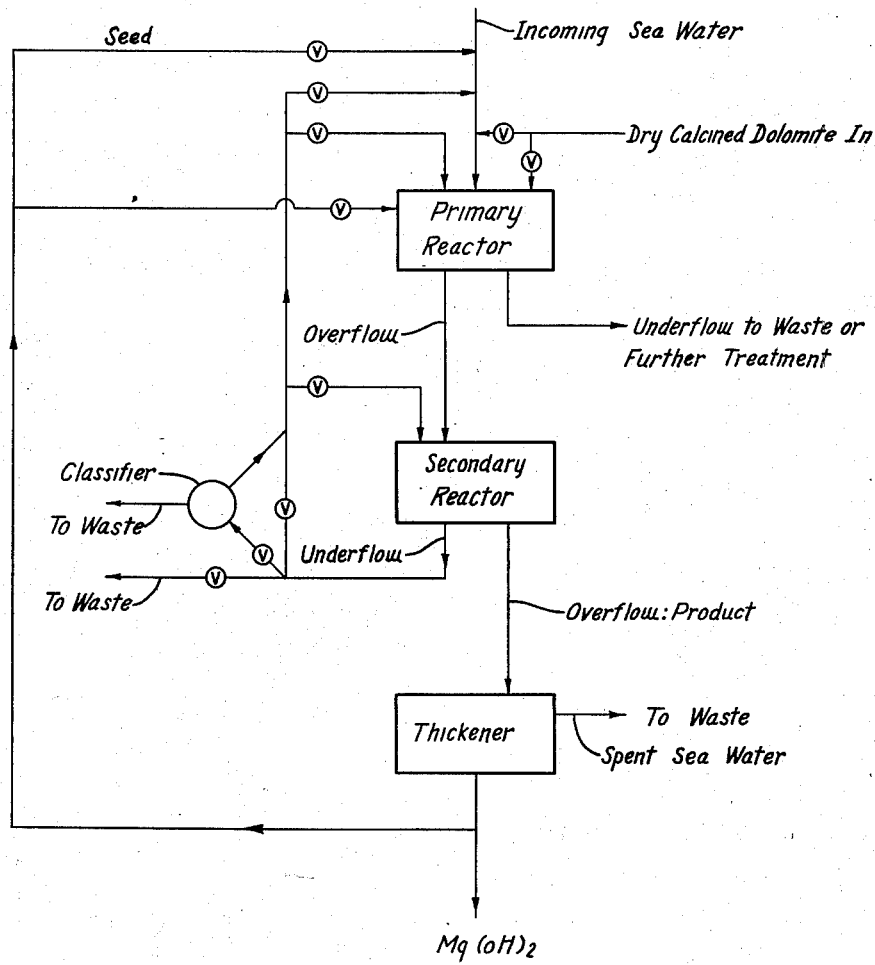

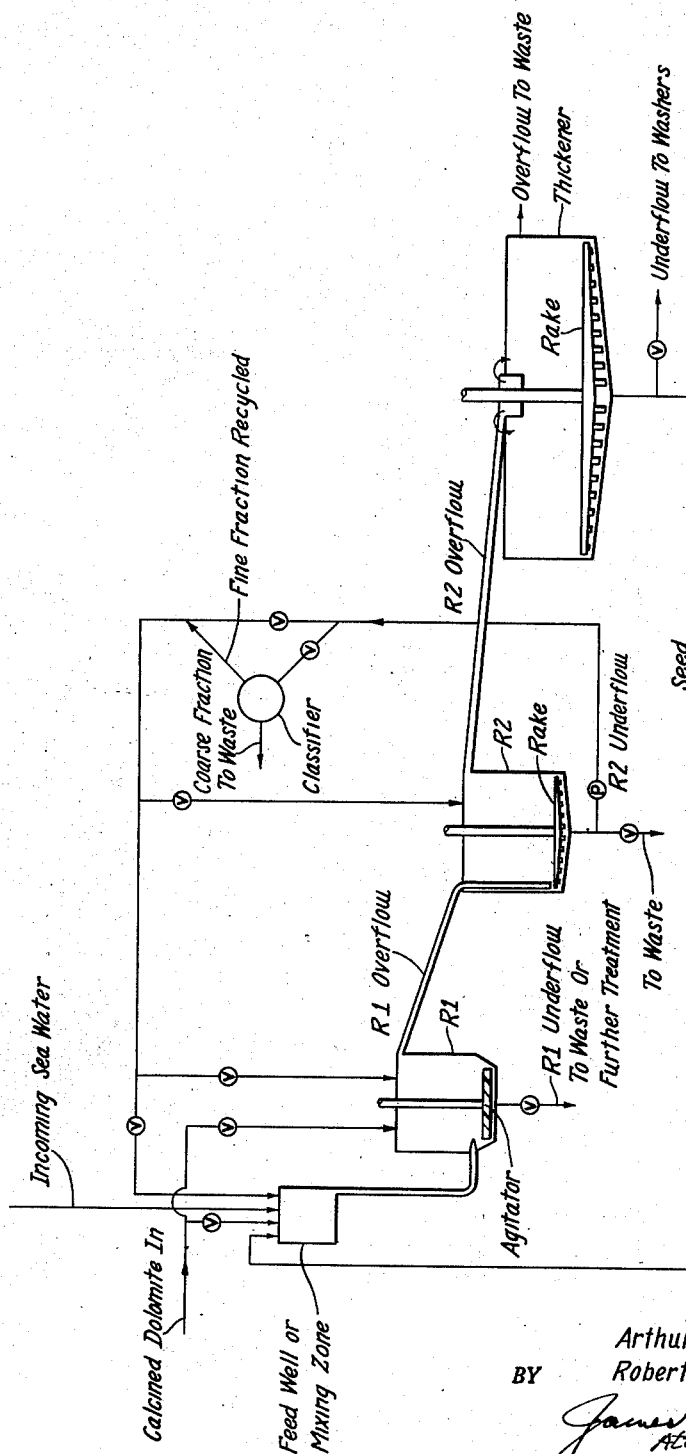

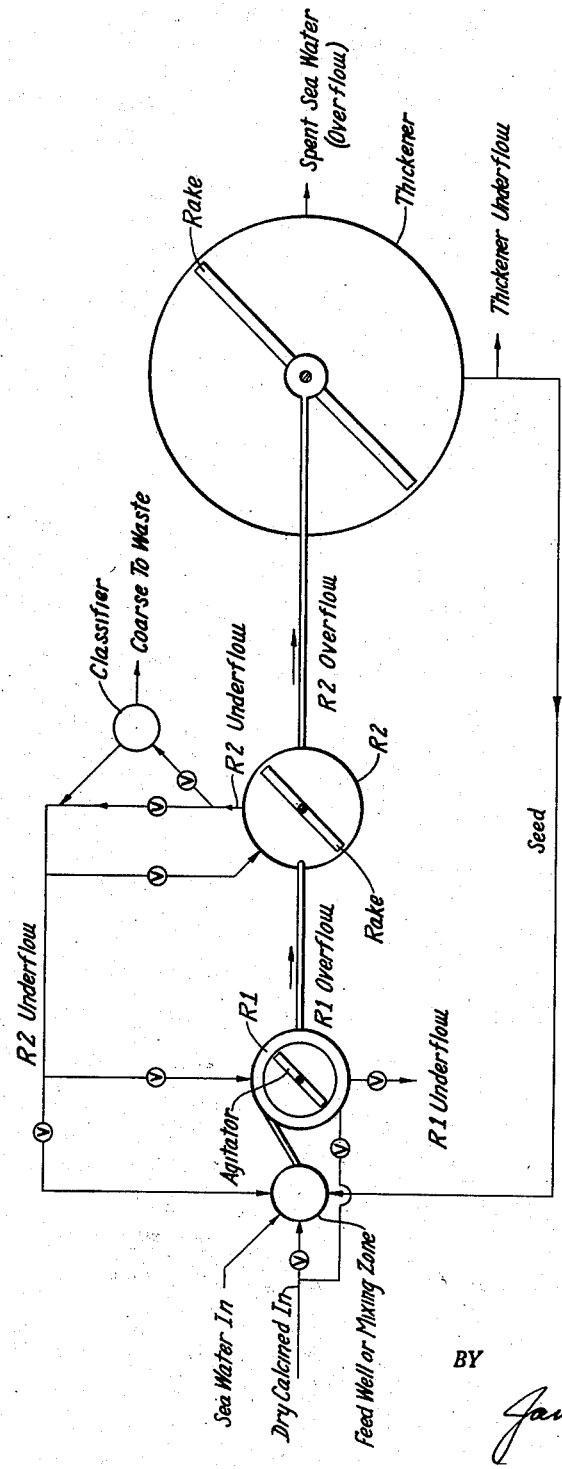

Patented Oct. 26, 1954

2,692,816

UNITED STATES PATENT OFFICE 2,692,816

PROCESS FOR PREPARING MAGNESIUM HYDROXIDE

Arthur W. Vettel and Robert D. Israel, Watsonville, Calif., assignors to Kaiser Aluminum & Chemical Corporation, Oakland, Calif., a corporation of Delaware Application April 11, 1952, Serial No. 281,792

15 Claims. (Cl. 23—201)

This invention relates to the production of magnesium hydroxide by precipitation thereof from magnesium salt-containing solutions; and, more particularly, by reacting such solutions with a dry calcined dolomite.

Magnesium salt-containing solutions of various types and concentrations, for example, brines, bitterns, various by-product liquors, and more dilute solutions, such as sea water, are good sources of magnesium values. It is particularly useful to recover these values by reacting these solutions with calcined dolomite, dolomite lime or magnesian lime, because thereby the magnesium values of the ores are also recovered. However, such ores contain impurities, including silica and iron and aluminum oxides, often in quite high amounts, which are not desired in the final magnesium hydroxide or oxide product, but which have proved difficult to remove. It has also proved difficult to produce a product which is low in lime, when employing such ores, with simultaneous high recovery of the magnesian values therein. With regard to the magnesium salt solutions as starting materials, dilute solutions such as sea water have been particularly costly to process, and it has been especially difficult to obtain therefrom, with some reactants, well-crystallized precipitates which can be efficiently dewatered.

Earlier workers in this field have proposed various processes for recovering the magnesian values from the above-mentioned salt solutions and ores, but difficulties and disadvantages have been encountered in that, for instance, it is difficult to obtain, simultaneously, high and efficient recovery of magnesium values and high purity product; and also in that the cost of operation has been high, and exceedingly careful control and supervision have been required. Another disadvantage has been that, in commercial operation, loss of CaO available for reaction has been high because it has been entrained by and removed with the rejected material, in the processes comprising reaction of dry calcined dolomite with sea water and selective removal of impurities in the reaction zone. Another disadvantage in this art has been that production rates are rather low because very large inventories are required in the reaction system to provide adequate contact time between the magnesium salt solution and the calcine to react as much of the lime as possible, while removing as much of the impurities as possible.

It has now been found, according to the present invention, that the above disadvantages are overcome and a very dense magnesium hydroxide precipitate of excellent settling and filtering characteristics and of high purity is efficiently obtained by mixing an aqueous magnesium salt solution, in the presence of magnesium hydroxide seed crystals, with dry, unground calcined dolomite, with vigorous agitation, in a primary reaction zone, partially reacting and agitating these components while heavier, coarser, unground particles containing impurities settle to the bottom of the zone and are withdrawn, removing or withdrawing as overflow the partially reacted mixture or slurry, conducting the overflow slurry to a secondary reaction zone, gently agitating the mixture in the second zone while, if desired, further amounts of impurities and unreacted particles settle to the bottom of this zone, and form a sludge, and then withdrawing as overflow a slurry of precipitated magnesium hydroxide and also magnesium hydroxide obtained by hydration of the MgO of the calcined dolomite. This slurry is then preferably washed; and can be partially dewatered; and can be dried; or it can be calcined or fired to form MgO of any activity desired, or to form periclase. Where a high purity final product is desired, the further amounts of impurities and any unreacted particles are allowed to settle to the base or bottom of the second reaction zone; and they are then withdrawn as an underflow or sludge and this sludge is at least partially recycled to the reacting mixture and can be introduced, for example, into the incoming stream of magnesium salt solution, or into the primary, or first, reaction zone. In preparing the high purity $Mg(OH)_2$ or MgO, the impurities are preferably removed from this underflow either continuously or intermittently. If a magnesium hydroxide or magnesia of lower purity is the final product, removal of underflow from the second reaction zone can be omitted.

The magnesium salt solution employed as starting material can be a more concentrated solution, such as the well-known inland brines available in Michigan, or bitterns, or it can be a dilute water solution containing less than 1% magnesium salt, for example, sea water. Where the more concentrated brines are employed, the dry calcine is fed into the top of the primary reactor. Underground brines should be allowed to settle, before introduction into the reaction system, to remove suspended material. Bitterns should be pretreated, as with calcium chloride solution, such as spent bittern, for example, to remove sulfate ion which would tend later to co-precipitate with the $Mg(OH)_2$ as gypsum. Sea water is preferably pretreated in the manner well-known to the art, with a small amount of lime or calcined dolomite, to form Ca carbonate, thereby removing the carbonates, the Ca carbonate precipitate being separately removed from the system. The invention will be described below with reference to the reaction of sea water.

The incoming water solution of magnesium salt is mixed with magnesium hydroxide seed crystals. An especially suitable source of seed crystals is magnesium hydroxide previously precipitated in this same process, although seed crystals from other sources are useful. A partially dewatered overflow slurry of product coming from the second reaction zone, of the present process, or a portion of the thick slurry or sludge withdrawn from a dewatering zone, such as a thickener tank, which is in series with the reaction vessels or tanks, is preferably employed. The amount of seed crystals provided is from 0.5 to 40 times the amount of magnesium hydroxide being precipitated in the reaction zone. Expressed in another way, the seed ratio is from 0.5:1 to 40:1. The amount of seed employed varies according to the magnesium salt solution being treated and according to the product desired. When a more concentrated Mg salt solution, for example, an inland brine or bittern, is employed, from 0.5:1 to 10:1 seed ratio is suitable, but preferably in this instance from 0.5:1 to 2.5:1 ratio is employed. When sea water or an equivalent dilute solution is employed, from 3:1 to 40:1 seed ratio is suitably used. When a product of higher purity is desired, the lower amounts of seed, for instance, from 3:1 to 18:1 when treating sea water, are employed within the preferred ratios set forth, because higher quantities of seed increase the amounts of impurities entrained and carried over in the reactor overflow, especially from the second reaction zone, as will be clearer from the more specific description of the process as set forth below. If the magnesium hydroxide is to be burned to produce a "deadburned magnesite," that is, well-crystallized magnesia having appreciable impurities content so that the crystal faces are well coated with impurities films, lesser purification is effected in the reactor and the higher seed ratios can be employed. The seed material is preferably mixed with the incoming stream of magnesium salt solution prior to addition of dry reactant in the primary reaction zone; but in an alternative procedure, the seed crystals can be introduced into this zone simultaneously with incoming solution and dry reactant.

The reactant admixed with the magnesium salt solution is calcined dolomite, dolomitic lime or magnesian lime. It is added as it comes from the calcining kiln, that is, as the so-called "kiln-run" material, without further crushing or grinding. In other words, the starting ore is crushed and then calcined, preferably at about 1100° C. for 15 to 30 minutes, to form a material containing active lime. A lower calcining temperature can be employed. Also, a higher temperature can be employed, suitably for a shorter time, to provide active lime. It is preferred to calcine the ore, containing substantial amounts of silica, at not over about 1200° C. in order also to avoid substantial reaction between the CaO and $SiO_2$ with formation of silicates, which would also effect considerable loss of CaO otherwise available for reaction with the Mg salt. The calcined product is then fed to the reaction zone without further grinding. Preferably, this unground calcine is of particles of which at least about 90% are larger than 0.2 mm. diameter; and it is preferred that at least 60% are larger than 0.4 mm. diameter; or it suitably contains about 90% of particles from one inch in diameter to 0.2 mm. diameter. It has been found that the above procedure leaves a substantial portion of the impurities, such as granite or other siliceous rock or the like, in larger pieces which settle or fall to the base of the reaction zone and are removed as "rocks," that is, in particles predominantly larger than 35 mesh, and substantially entirely larger than 65 mesh. These particle sizes correspond, respectively, to 0.417 mm. and 0.208 mm. diameter, as shown in the data on Tyler screens appearing on page 1719 of the Chemical Engineers' Handbook, John H. Perry, 2nd edition, published by McGraw-Hill Book Company, Inc., 1941. A dolomite which has been found particularly useful in this process is one in which the siliceous impurities exist in discrete masses of appreciable size rather than as well-dispersed finer particles. A decrepitating dolomite, such as is found in deposits near Natividad, California, that is, a dolomite of which the particles tend to burst upon heating, is particularly useful. The Natividad dolomite also exhibits substantial spontaneous dispersion when dropped into a Mg salt solution. Chemical analyses of the Natividad dolomite show the following typical results, on the ignited basis, after calcination in a rotary kiln at about 1100°–1200° C.: 38.06% MgO, 59.66% CaO, 1.60% $SiO_2$, 0.33% $Fe_2O_3$ and 0.34% $Al_2O_3$. Other dolomites or magnesian limestones having equivalent distribution of impurities are suitable. Where a non-decrepitating dolomite is employed, the calcined dolomite can be crushed to substantially entirely minus 4 mesh, at least about 90% of the particles being at least 0.2 mm. in diameter. The present process enables efficient utilization of dolomites of higher impurities content. The calcined dolomite can be added in an amount to react from 85% to 90% of the available Mg ion in the sea water; but it is often suitably added in an amount to react 99% to 100% thereof. When treating brines it is especially desirable to add sufficient calcine to react at least 99% of the Mg ion, because it has been observed that the precipitated $Mg(OH)_2$ obtained thereby settles more rapidly and filters better. If desired, sufficient calcine can be added to provide an excess over that required to react all of the Mg ion. The addition of dry calcine in these larger particle sizes, in this process, produces a magnesium hydroxide precipitate which settles more rapidly and filters better than the precipitates obtained with lime or calcined dolomite in the form of dry hydrate or of water slurry, or in particles substantially all finer than 200 mesh.

Where sea water, or a magnesium salt solution containing calcium bicarbonate is to be reacted, it is preferably first "sweetened," or pretreated to precipitate the soluble bicarbonate values, by addition of a small amount of lime or calcined dolomite. This pretreatment step is well-known to the art and does not form part of the present invention which will be described below as if, where desired, the pretreatment had been performed, prior to mixing of the reactants.

In one embodiment of this invention, an incoming stream of sea water is mixed with seed crystals of magnesium hydroxide, in an amount of from 3 times to 18 times the amount of magnesium hydroxide being precipitated in the reaction zone. Where the final product is not required to be of high purity, a seed ratio of greater than 18:1 can be employed. Dry, unground calcined Natividad dolomite as described above is mixed with the sea water containing the seed crystals and the whole is introduced into a primary reaction zone where it is vigorously agitated. In this zone, the dry calcine begins to react with the sea water to form $Mg(OH)_2$ and the relatively coarse particles of calcine begin to break up in such a manner that the discrete masses of impurities, particularly siliceous impurities, are largely freed of CaO and MgO values and fall to the base of the primary reaction zone. The "rocks" are removed therefrom as underflow and can be sent to waste. (Alternatively, the "rocks" underflow can be vigorously agitated with a fresh amount of sea water or other Mg salt solution, the mixture screened to remove material coarser than 35 mesh which is then sent to waste; and the material passing through the screen is then returned to the primary reactor, thus more completely recovering the CaO and MgO values from the "rocks." This alternative procedure is also useful with other embodiments of this invention.) Upon analysis, a typical sample of this underflow is observed to contain 35.88% MgO, 35.52% CaO, 23.06% $SiO_2$, 0.85% $Fe_2O_3$ and 4.69% $Al_2O_3$. This corresponds to from 1% to 1.25% total available MgO; and less than 1.5% total CaO, some of which is present as an unreactable compound, e. g. carbonate, aluminate or silicate, and therefore would never be converted to $CaCl_2$ in this reaction process. From 40% to 70% of the total $SiO_2$ introduced with the reactants, either as silica or in combined form, is removed with the underflow from the primary reactor.

Agitation in the primary reaction zone can be suitably effected by a mechanical stirring device, such as conventional rake arms mounted on a vertical, centrally disposed shaft driven by any suitable means, especially where this reaction zone is formed by a tank or vat of circular cross-section. More efficiently, the desired agitation and effective contact between the magnesium salt solution and dry feed particles is effected by introducing a mixture of the solution and seed crystals tangentially into the base of the reaction zone and also agitating mechanically. In this embodiment, incoming sea water and seed crystals and, if desired, the underflow from the secondary reaction zone are mixed together, for example, in a mixing vessel, and this mixture is then introduced tangentially into the base of the primary reaction zone.

There is withdrawn separately from the primary reaction zone, as overflow, a mixture of partially reacted sea water, seed crystals and partially reacted feed particles. This mixture is conducted to a secondary reaction zone where it is retained, with gentle agitation, while reaction proceeds to the desired completion with respect to the sea water. In the secondary reaction zone, the larger and heavier feed particles which have been carried over settle to the base of the zone and are withdrawn as underflow, and the slurry of spent sea water and precipitated magnesium hydroxide product is separately withdrawn as overflow.

The particles which settle in the secondary reaction zone are likewise enriched in impurities but still contain, usually, appreciable amounts of available lime and magnesia. The underflow therefore is preferably recycled to the reaction system, preferably to the incoming stream of solution or to the primary reactor, and reacts further with fresh sea water. From time to time the underflow is sent to waste to reduce the circulating load of impurities and improve the purity of the product. This purification can be effected by withdrawing underflow to waste when the silica content reaches 25%. That is to say, this underflow can be intermittently withdrawn to waste to maintain the silica content thereof at not over about 25%. When the silica content or specific gravity is reduced as desired, the underflow is again recycled. Alternatively, a portion of the underflow can be continuously withdrawn to waste, preferably to maintain the silica content at not over about 25 to 30%. In an alternative procedure, the secondary underflow is classified and the slurry or sludge containing the finer particles, preferably those passing 100 mesh (less than 147 microns diameter) is recycled, and those particles retained on 100 mesh are withdrawn to waste or discarded. This classification is efficiently carried out by subjecting the underflow to action of centrifugal force, for example, in a cone classifier, comprising a tubular or cylindrical portion and a conical portion adjacent thereto, wherein the slurry is introduced tangentially adjacent the base of the cylindrical portion of the cone, a slurry of minus 100 mesh particles is withdrawn at the base and a slurry of plus 100 mesh particles is withdrawn at the apex of the conical portion adjacent the cylindrical portion. (Such a cone classifier, useful herein, is shown and described in "Chemical Engineering," June 1950, page 146.) The coarser slurry recovered by classification contains a major portion of the siliceous impurities in the underflow, and the slurry of finer particles recovered by classification comprises unreacted CaO and $Mg(OH)_2$ with very small amounts of contaminating impurities, including silica, sesquioxides (principally $Fe_2O_3$, $Al_2O_3$) and calcium compounds not adapted to react in this process. Other sesquioxides, $Mn_2O_3$ and $B_2O_3$, are present in both the coarser slurry and the finer slurry fractions. All or a portion of the secondary underflow, in an alternative embodiment, is recycled to the secondary reaction zone, for more complete reaction of the CaO available therein; but preferably it is recycled to the primary reaction zone or the incoming stream of sea water.

The overflow slurry product from the secondary reaction zone is withdrawn, preferably to a dewatering zone. The slurry goes to a thickener or series of thickeners where the $Mg(OH)_2$ settles forming a more concentrated sludge in each tank and is washed in the thickener by a countercurrent flow of fresh water in the manner known to the art. After leaving the thickener system, the sludge is preferably filtered. The magnesium hydroxide filter cake obtained as described is of high purity, and it can be stored or used, or it can be calcined to yield magnesia of varying activities, or can be burned to form well-crystallized periclase in any desired manner.

The sludge from the first thickener zone is a very good source of seed material for admixture with the magnesium salt solution to be reacted, and in a preferred procedure a portion of this sludge is recycled to the incoming stream of solution. A small amount of seed is provided by the recycled underflow from the secondary reaction zone, but sufficient is added from the thickener zone to provide the amounts described above.

In the accompanying drawings, which are illustrative of some of the embodiments of the present invention, Fig. 1 is a flowsheet setting forth steps of the present process;

Fig. 2 is a schematic elevation view of a suitable small-scale plant installation adapted to carry out the present process; and Fig. 3 is a schematic plan view of the installation of Fig. 2.

In Figs. 2 and 3, R1 is the primary reactor, R2 is the secondary reactor; P is a pump, in each instance; and V is a valve, in each instance. Suitable means are provided, but not shown, for driving rakes and agitators. Otherwise, complete legends are provided in each figure, and the mode of carrying out the process will be made clear by reference to the drawings, and by the detailed description below.

It is an advantage of the process according to this invention that the lime in the calcined dolomite which is available for reaction is more completely utilized. Some of the lime is always present in the ores in question in the form of compounds as described above which do not react with magnesium chloride; but of the available lime, CaO, a substantial portion has been lost in the processes of the earlier art because it does not react with the $MgCl_2$ with sufficient rapidity to be completely utilized in commercial operations. It is believed that this is due in part to the circumstance that milling or grinding of the calcined dolomite has tended to close the pores and channels, making less surface available for hydration and reaction. This disadvantage is overcome by feeding the calcine as it comes from the calcining kiln, and without grinding or milling. More complete utilization is also effected by the vigorous agitation in the primary reaction zone which enables excellent contact between the reacting components. This combination of steps, furthermore, enables separation of the major portion of impurities in the primary reaction zone, and the gentle agitation in the secondary reaction zone provides more complete reaction with separation of a further portion of impurities because the smaller but heavier impurities-enriched particles settle to the base of the second zone under these conditions, agitation in the secondary reaction zone being controlled to permit settling of the unreacted particles. Avoidance of grinding also is advantageous in that the impurities, especially silicates, both naturally occurring in the ore and also formed during calcination thereof, and silica, are not finely divided and subsequently distributed in the precipitated product; and less power is required by the avoidance of the grinding step. It is a further advantage, though the reason therefor is not clearly understood, that there is obtained a magnesium hydroxide precipitate of excellent settling and filtering characteristics without the necessity for appreciable dilution of the incoming magnesian brine, whereas in earlier processes a considerable amount of spent liquor was added to dilute the incoming solution, for best results. Another advantage of the present process is that a smaller inventory of circulating solids can be maintained because of the more efficient mixing and the early elimination of substantial amounts of impurities, resulting in substantial savings in cost and in equipment of a plant. It is especially advantageous that retention time of reactants in the system is reduced, for instance, by 25% to 30%. It is a still further advantage that the magnesium hydroxide obtained is of high purity; and it is believed that one reason for this is that the lime is more efficiently utilized in the reaction zone proper and less unreacted CaO is carried over to the dewatering and washing zones. It has been found to be a particular advantage that the capacity of a given over-all installation is substantially increased by the present invention, by adding a primary reactor and especially in an embodiment wherein the calcined dolomite as added flows countercurrently to the seeded sea water. In this embodiment, the calcine is, for instance, added at the top of the primary reactor and falls through the reacting mixture, the seeded sea water entering at the bottom of the reaction zone. It is postulated that a particle of calcine meets partially reacted sea water when it first enters the reaction zone and as it settles through the reacting mixture, with vigorous agitation, the reacting and partially reacted, heavier particle eventually comes into contact with incoming solution containing its greatest concentration of Mg salt. In this manner, substantially all of the lime and magnesia values are recovered from the larger and heavier particles and the residual impurities are withdrawn at the base of the primary reactor and are sent to waste. The smaller particles are entrained in the overflow slurry by the vigorous agitation practiced in this zone and are carried to the second reaction zone where further reaction between the partially reacted sea water and the calcined dolomite is effected. This avoids undesirably long retention time and greater volumes can flow through and be reacted in the reaction system. A still further advantage is that dilution of the reacting mixture, as by recycling spent brine or reactor overflow, is no longer necessary.

In an example of the mode of operation of the process of this invention, there is employed equipment as shown in Figs. 2 and 3. In this example, in a test continuing for about ten days, 38 gallons per minute of sea water are mixed with recycled thickener underflow containing 65 gms. MgO (94 gms. $Mg(OH)_2$) per liter, in an amount to provide a seed ratio of 9:1, and this mixture is introduced tangentially into R1, at the base thereof. There are introduced at the top of R1, 1.30 pounds per minute of calcined Natividad dolomite of the following analysis: 39.55% MgO, 57.59% CaO, 2.19% $SiO_2$, 0.25% $Fe_2O_3$ and 0.42% $Al_2O_3$. The calcined dolomite comprises particles of the following sizes: 16.5% retained on 10 mesh, 55% passing 10 mesh and retained on 35 mesh, 28.5% passing 35 mesh. The total mixture is stirred vigorously in R1 and partially reacted mixture is taken off as overflow and introduced into R2, where slight agitation is effected by means of the slowly revolving rake.

The heavier particles which settle to the base of R1 are withdrawn from time to time as the impurities become concentrated (or, preferably, continuously) and the material withdrawn exhibits the following average analysis, on the ignited basis: 35.88% MgO, 35.52% CaO, 23.06% $SiO_2$, 0.85% $Fe_2O_3$, 4.69% $Al_2O_3$. In this test, a total of 15,306 pounds of calcined dolomite are fed and 1015 pounds of material are withdrawn to waste from R1, this rejected material having the foregoing average analysis.

The larger and heavier particles present in the mixture fed to R2 settle to the base thereof and are also continuously withdrawn. The overflow, which is a slurry of precipitated magnesium hydroxide in spent sea water in which about 85% of the available magnesium ion has been reacted, is introduced into a thickener zone where it is partially dewatered, spent sea water going to waste as overflow, and the thickened sludge being withdrawn at the base, a portion of the thickened sludge being recycled to the incoming stream of sea water as seed, as above noted. The remainder of the sludge from the first thickening is conducted to a further thickener or thickeners and is washed with a countercurrent flow of fresh water, in the known manner.

The particles which settle to the base of R2, forming a sludge, are withdrawn and, in this example, are classified in a cyclone classifier into a coarser fraction containing particles predominantly larger than 44 microns diameter and a finer fraction containing particles predominantly less than 44 microns in diameter. The finer fraction is recycled to the reaction system, being introduced, in this example, into the top of R1. The solids of the R2 coarser fraction, which is sent to waste, have the following average analysis on the ignited basis: 74.26% MgO, 15.05% CaO, 8.37% $SiO_2$, 0.67% $Fe_2O_3$ and 0.86% $Al_2O_3$. A total of 128 pounds of solid material is sent to waste from R2, during this test series.

The thickened sludge withdrawn from the above-described dewatering zone, after washing, is filtered under vacuum and there is recovered a filter cake of magnesium hydroxide product containing 49.5% solids. The product has the following average analysis on the ignited basis: 97.85% MgO, 1.18% CaO, 0.59% $SiO_2$, 0.22% $Fe_2O_3$ and 0.16% $Al_2O_3$. Over 94% of the total available CaO of the calcined dolomite is reacted and over 96% of the total available MgO in the sea water and the dolomite, exclusive of the 15% unreacted Mg ion in the sea water, is recovered. The filter cake can be used as such, stored, or calcined or burned to produce magnesia of any desired activity.

Instead of using the cyclone classifier described in the above example, the underflow from the secondary reaction zone can be screened to remove particles greater than 35 mesh (0.5 mm. diameter) to remove a major portion of the impurities, the smaller particles being then recycled to the reaction system. The above process can also be operated batchwise, but it is more practical to operate as a continuous process. In another variation of the process, the heavier underflow from the primary reactor can be continuously removed to a smaller tank or vessel (hydro-treater) and there vigorously agitated with a quantity of sea water to recover still more completely the available Ca and Mg values still remaining therein. In this operation, overflow withdrawn from this vessel or hydro-treater is also introduced into the secondary reaction zone and the heavier particles falling to the base of the hydro-treater are sent to waste. The Natividad dolomite employed hereinabove is especially useful because after calcination at not over about 1200° C., the reactive calcine exhibits substantial spontaneous dispersion when mixed with the sea water. This dolomite is obtained from deposits located near Natividad, County of Monterey, California.

In accordance with usual practice in this art, the various constituents are usually reported in the analyses as though they were present as the simple oxides although they may actually exist, at least in part, as other compounds. For example, calcium is expressed as lime, CaO, although it may be present, at least in part, as a silicate, carbonate, aluminate or other compound. The MgO reported is substantially entirely present as the oxide. Percentages and parts are by weight except where otherwise indicated. All mesh or screen sizes are Tyler standard screen sizes as reported in the Handbook described above.

This application is a continuation-in-part of our co-pending application, Serial No. 55,352, filed October 19, 1948, now Patent No. 2,595,314, dated May 6, 1952.

Having now described the invention, what is claimed is:

1. In the process for preparing magnesium hydroxide comprising mixing aqueous magnesium salt solution with magnesium hydroxide seed and reacting said mixture with dry calcined dolomite to form a precipitate of magnesium hydroxide and separately removing from the reaction zone an impurities-enriched underflow and as overflow said precipitated magnesium hydroxide, the improvement which comprises admixing with said solution and magnesium hydroxide seed dry calcined dolomite of which at least about 90% of its particles are larger than 0.2 mm. diameter, vigorously agitating said admixture in a primary reaction zone, separately removing from said primary reaction zone an impurities-enriched underflow and a primary overflow containing precipitated magnesium hydroxide and unreacted feed components, introducing said primary overflow into a secondary reaction zone, gently agitating while an impurities-enriched solids fraction settles to the bottom of said secondary zone, removing secondary overflow containing precipitated magnesium hydroxide and separately removing a second impurities-enriched underflow, and recycling at least a portion of said second underflow to the reaction system, said magnesium hydroxide seed being added in an amount to provide from 0.5 to 40 times the amount of magnesium hydroxide being precipitated.

2. Process as in claim 1 wherein said magnesium salt solution is a dilute magnesium salt solution containing less than 1% of magnesium salt.

3. Process as in claim 1 wherein said magnesium salt solution is sea water.

4. Process as in claim 1 wherein said dry calcined dolomite is of particle size at least about 90% larger than 0.2 mm. and at least about 60% larger than 0.4 mm. diameter.

5. Process as in claim 1 wherein said calcined dolomite is derived from decrepitating dolomite.

6. Process as in claim 1 wherein said second underflow is partially withdrawn to waste to maintain the silica content thereof at not over about 25.0%.

7. Proces for preparing magnesium hydroxide which comprises mixing incoming magnesium salt solution, magnesium hydroxide seed in a ratio of from 0.5 to 40 times the amount of magnesium hydroxide being precipitated, and dry unground calcined dolomite of which at least about 90% of its particles are larger than 0.2 mm. diameter, vigorously agitating said admixture in a primary reaction zone, separately removing from said primary reaction zone an impurities-enriched underflow, and a primary overflow containing precipitated magnesium hydroxide and unreacted feed components, introducing said primary overflow into a secondary reaction zone, gently agitating while an impurties-enriched solids fraction settles to the bottom of said secondary zone, removing secondary overflow containing precipitated magnesium hydroxide and separately removing a second impurities-enriched underflow, separating the major portion of impurities from said second underflow and recycling said purified second underflow to said primary reaction zone, introducing said secondary overflow to a dewatering zone, partially dewatering said overflow, and returning a portion of said dewatered overflow to said incoming salt solution to provide magnesium hydroxide seed.

8. Process as in claim 7 wherein said major portion of impurities are separated by centrifugal force from said second underflow.

9. Process as in claim 7 wherein said magnesium salt solution is a concentrated magnesium salt solution and said seed is added in a ratio of from 0.5 to 10 times the amount of magnesium hydroxide being precipitated.

10. Process as in claim 7 wherein said magnesium salt solution is a concentrated magnesium salt solution and said seed is added in a ratio of from 0.5 to 2.5 times the amount of magnesium hydroxide being precipitated.

11. Process as in claim 7 wherein said magnesium salt solution is sea water and said seed is added in a ratio of from 3 to 18 times the amount of magnesium hydroxide being precipitated.

12. Process as in claim 7 wherein said calcined dolomite is reactive decrepitating dolomite exhibiting substantial spontaneous dispersion when mixed with magnesium salt solution.

13. A continuous process for preparing magnesium hydroxide which comprises mixing incoming Mg salt solution and magnesium hydroxide seed material from a previous operation in an amount to provide from 0.5 to 40 times the amount of magnesium hydroxide being precipitated, introducing said mixture tangentially into the base of a primary reaction zone, adding at the top of said reaction zone dry calcined dolomite of which at least about 90% of the particles are larger than 0.2 mm. diameter, vigorously agitating said admixture, separately removing from said primary reaction zone an impurities-enriched underflow, and a primary overflow containing precipitated magnesium hydroxide and unreacted calcined dolomite, introducing said primary overflow into a secondary reaction zone, gently agitating while an impurities-enriched solids fraction settles to the bottom of said secondary zone, removing secondary overflow containing precipitated magnesium hydroxide and separately removing a second impurities-enriched underflow, recycling at least a portion of said second underflow to said primary reaction zone, introducing said secondary overflow to a thickening zone, and recycling a portion of thickened overflow to said incoming salt solution to provide said seed.

14. A continuous process for preparing magnesium hydroxide which comprises mixing incoming sea water and magnesium hydroxide in an amount to provide from 3 to 18 times the amount of magnesium hydroxide being precipitated, introducing said mixture tangentially into the base of a primary reaction zone, adding at the top of said zone dry, unground calcined reactive decrepitating dolomite exhibiting substantial spontaneous dispersion when mixed with magnesium salt solution, of which at least about 90% of the particles are larger than 0.2 mm. diameter, vigorously agitating said admixture, separately removing from said primary reaction zone an impurities-enriched underflow, and a primary overflow containing precipitated magnesium hydroxide and unreacted feed components, introducing said primary overflow into a secondary reaction zone, gently agitating while an impurities-enriched solids fraction settles to the bottom of said secondary zone, removing from said secondary zone a second overflow containing precipitated magnesium hydroxide and separately removing a second impurities-enriched underflow, classifying said second underflow to remove particles larger than 100 mesh, recycling said classified underflow to said primary reaction zone, introducing said second overflow to a thickening zone, and recycling a portion of said thickened overflow to said incoming salt solution.

15. In the process for preparing magnesium hydroxide comprising mixing aqueous magnesium salt solution with magnesium hydroxide seed and reacting said mixture with dry calcined dolomite to form a precipitate of magnesium hydroxide and separately removing from the reaction zone an impurities-enriched underflow and as overflow said precipitated magnesium hydroxide, the improvement which comprises admixing with said solution and seed dry calcined dolomite containing at least 90% of particles larger than 0.2 mm. in diameter, vigorously agitating said admixture in a primary reaction zone while coarser particles of said dry calcined dolomite fall to the base of said zone, separately removing from said zone an impurities-enriched underflow and a primary overflow slurry containing precipitated magnesium hydroxide and unreacted feed components, introducing said primary overflow slurry into a second reaction zone, gently agitating said slurry in said second reaction zone to effect further reaction of the feed components, withdrawing said slurry from said second zone and dewatering said withdrawn slurry, said magnesium hydroxide being added in an amount to provide from 0.5 to 40 times the amount of magnesium hydroxide being precipitated in said zone.

References Cited in the file of this patent

UNITED STATES PATENTS

| Number | Name | Date |
| --- | --- | --- |
| 1,505,202 | Judd | Aug. 19, 1924 |
| 2,124,002 | Mastin | July 19, 1938 |
| 2,224,780 | Chesny | Dec. 10, 1940 |
| 2,255,422 | Heath et al. | Sept. 9, 1941 |
| 2,281,477 | Chesny | Apr. 28, 1942 |
| 2,405,055 | Robinson et al. | July 30, 1946 |
| 2,493,752 | De Maestri | Jan. 10, 1950 |
| 2,595,314 | Vettel et al. | May 6, 1952 |